(No Model.) 3 Sheets—Sheet 1.
M. B. LAWRENCE, D. M. PATTERSON & J. Q. A. SAND.
EMPLOYÉ'S TIME RECORDER.
No. 467,179. Patented Jan. 19, 1892.
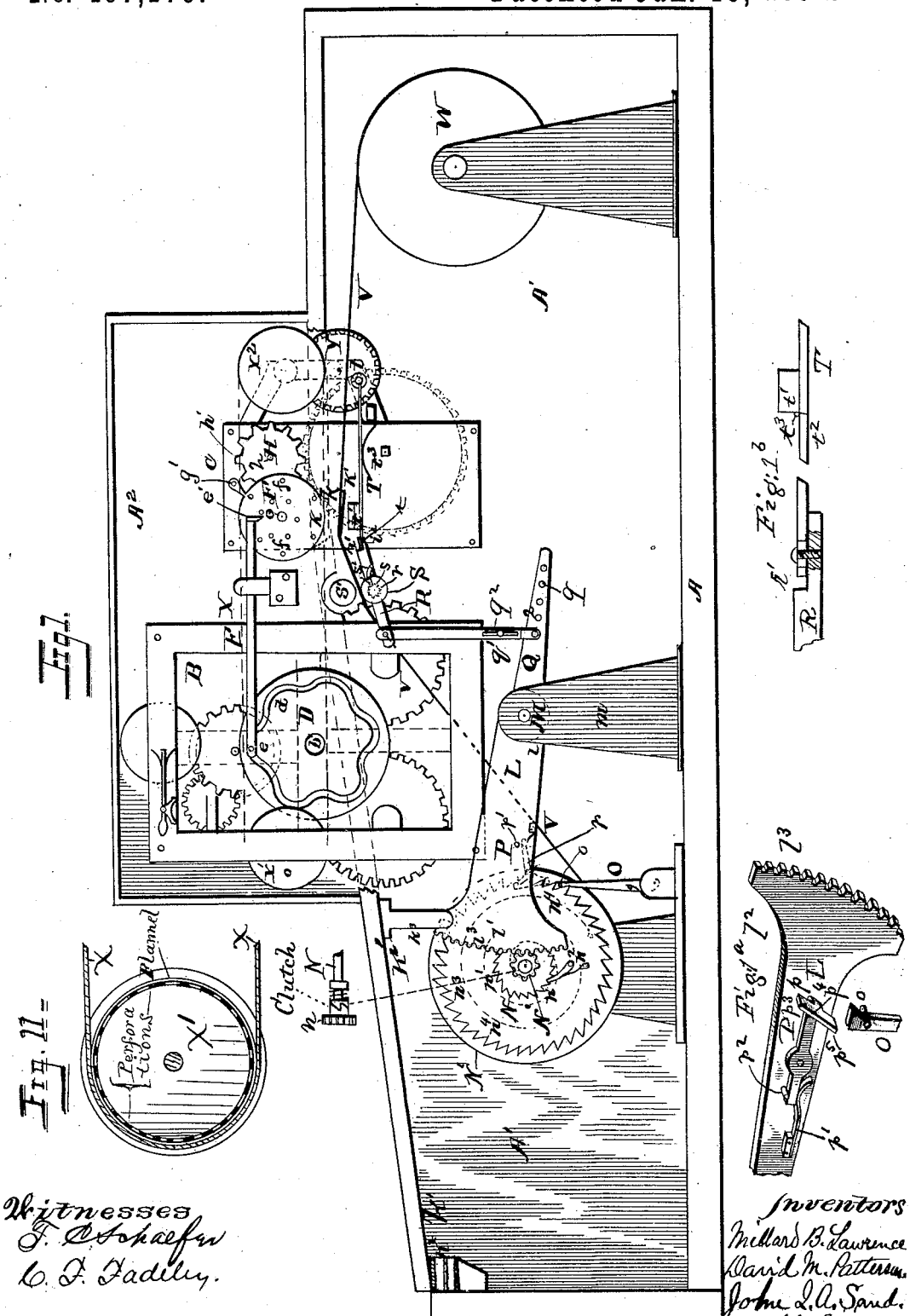
Witnesses
F. A Schaefer
C. F. Fadely.
Inventors
Millard B. Lawrence
David M. Patterson
John Q. A. Sand.
per M. H. Singleton atty.

(No Model.) 3 Sheets—Sheet 2.
M. B. LAWRENCE, D. M. PATTERSON & J. Q. A. SAND.
EMPLOYÉ'S TIME RECORDER.
No. 467,179. Patented Jan. 19, 1892.
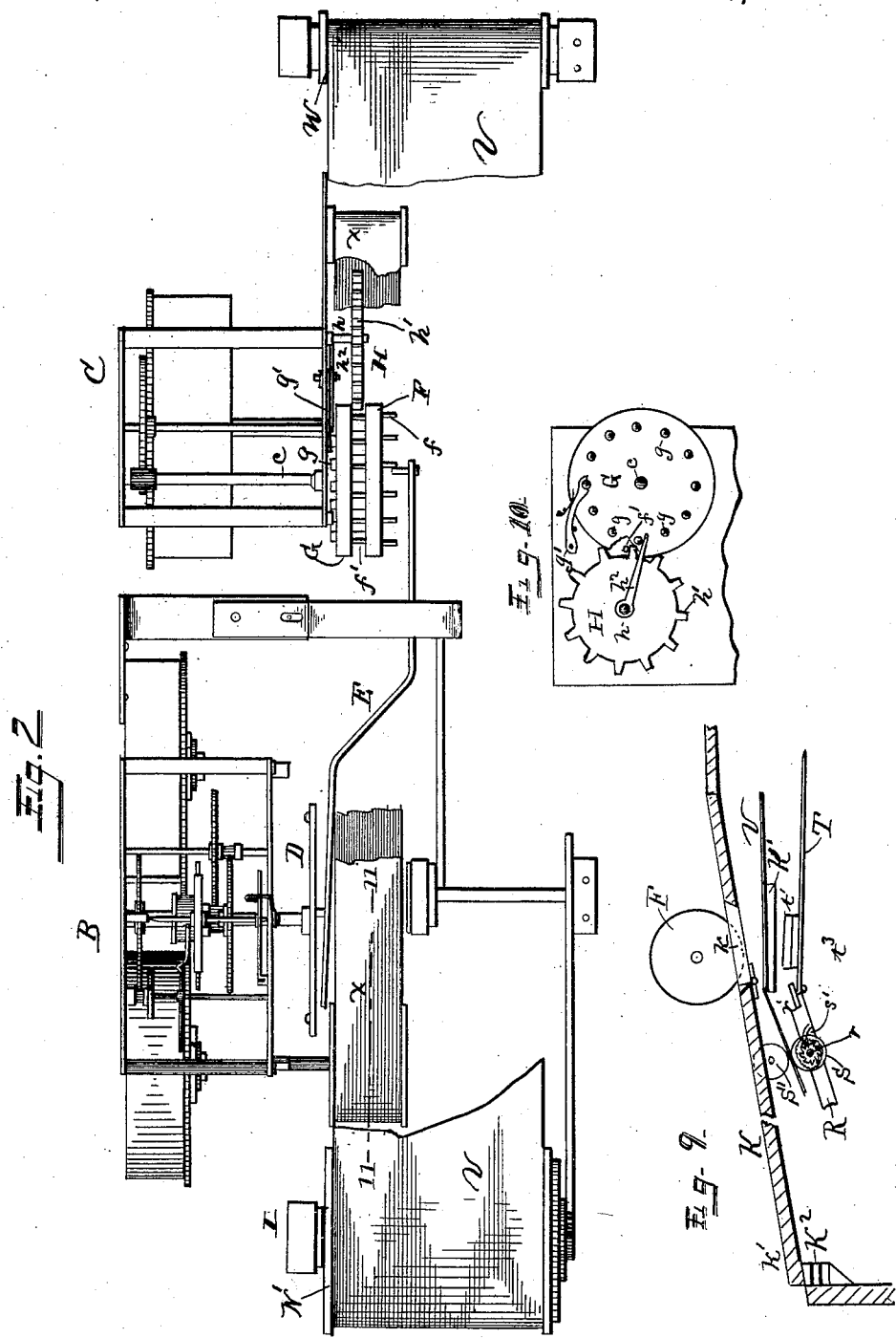

(No Model.) 3 Sheets—Sheet 3.
M. B. LAWRENCE, D. M. PATTERSON & J. Q. A. SAND.
EMPLOYÉ'S TIME RECORDER.
No. 467,179. Patented Jan. 19, 1892.
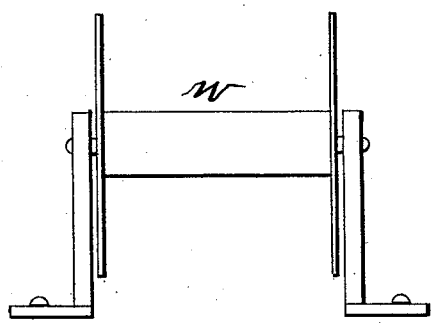
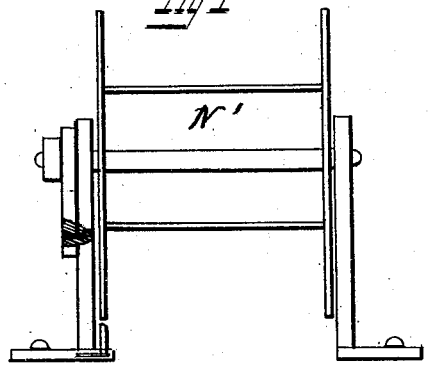
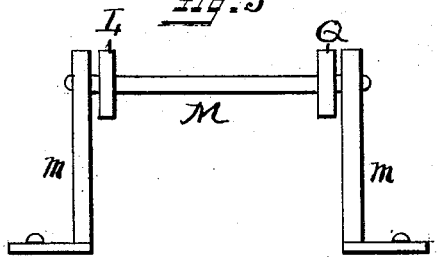
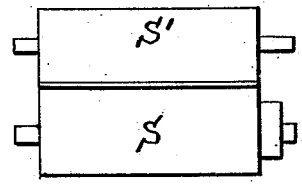
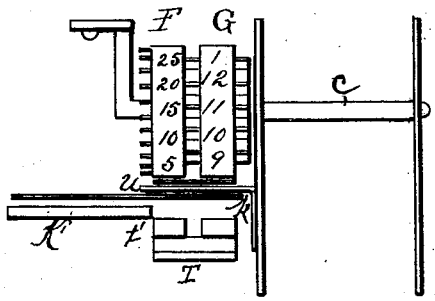
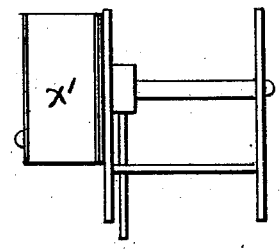

United States Patent Office.

MILLARD B. LAWRENCE, DAVID M. PATTERSON, AND JOHN Q. A. SAND, OF BALTIMORE, MARYLAND.

EMPLOYÉ'S TIME-RECORDER.

SPECIFICATION forming part of Letters Patent No. 467,179, dated January 19, 1892.

Application filed March 6, 1891. Serial No. 384,036. (No model.)

*To all whom it may concern:*

Be it known that we, MILLARD B. LAWRENCE, DAVID M. PATTERSON, and JOHN Q. A. SAND, citizens of the United States, residing at Baltimore city, State of Maryland, have invented certain new and useful Improvements in Employés' Automatic Time-Recorders; and we do hereby declare the following to be a full, clear, and exact description of the invention, such as will enable others skilled in the art to which it appertains to make and use the same.

Figure 1 is a side view of the device, a portion of the frame-work being removed to show the interior. Figs. 1ª and 1ᵇ represent enlarged details. Fig. 2 is a plan view. Fig. 3 is a detail view of the strip-holding roller; Fig. 4, a detail view of the strip-winding drum. Fig. 5 is an end view of the levers for operating the drum and the printing-hammer. Fig. 6 is a view of the strip-withdrawing rolls. Fig. 7 is an edge view of the time-rolls. Fig. 8 is a similar view of the inking-rolls and reservoir. Figs. 9 and 10 represent enlarged details. Fig. 11 is an enlarged vertical section of the ink-reservoir and contiguous parts on line 11 11 of Fig. 2.

This invention relates to an improved device for keeping the time of employés, workmen, watchmen, and others.

The object of the invention is to produce a device which will register the time when an employé signs his name upon the recorder and which shall unerringly indicate the time of the entry.

To this end the invention consists in the device hereinafter set forth.

In the annexed drawings, the letter A indicates a suitable frame-work or box having the elongated base A' and the upward projecting top A² at one side, the base A' extending at both ends beyond the top A². Secured on this box A, partly in the top A² and partly in the base A' and in proper juxtaposition with each other, are two clock-movements B and C.

To the center arbor $b$ of the movement B is secured a cam-wheel D. This wheel has the cam-slot $d$ made with twelve (12) curves, as shown. Engaging this slot $d$ is a pin $e$, projecting from a lever E, which is suitably pivoted in the frame A, and has at its other end a finger $e'$, projecting toward the clock-movement C. Upon the arbor $c$ of this movement C is placed two wheels F and G, the former F at the end and fast on the arbor, the latter G loose on the arbor.

Secured on a shaft $h$ is a wheel H, having twelve (12) teeth $h'$ on its periphery, the edges of the teeth coming between the edges of the wheels F and G and engaging with twelve (12) pins $f'$ on the inner face of the wheel F. Secured to the shaft $h$ is a finger $h^2$, which revolves with the shaft and comes against the inner face of the wheel G, where there are twelve (12) teeth $g$. Fastened to the frame of the clock-work C is a detent, pawl $g'$ on the path of the teeth $g$. On the outer face of the wheel F are placed twelve (12) pins $f$, arranged in two circles of six (6) each, the pins thus zigzagging and being equal distances apart around the circle. The finger $e'$ on the lever E is in such position that it alternately catches and releases a pin of one circle and then a pin of the other. The edge of the wheel G is furnished with numerals for the twelve hours corresponding with the twelve teeth $g$, and the wheel F is furnished with numerals indicating the minutes in an hour five (5) minutes apart, one number for each pin and tooth, both sets of numbers being so spaced apart that a numeral for the hour and a numeral for the minutes will be aligned at the bottom when revolved. With such a construction as this, the clock-movements being wound up, the cam-wheel D, turning alternately, throws the lever E up and down, alternately locking and releasing a pin of the wheel F, allowing the latter to turn partially every five (5) minutes. This brings the numbers on the wheel F at the bottom one after another. At the same time the wheel H and shaft $h$ turn the pins $f'$, engaging the teeth $h'$. At every full revolution of the wheel F and the shaft $h$ the finger $h^2$, engaging a tooth $g$, partially turns the hour-wheel G for the next hour. In this way the time of the two wheels is changed every five (5) minutes.

In the top of the base A and on a line with the numbers at the bottoms of the wheels F and G is a transverse slot $k$, preferably beveled off at front and rear, and in the box below the slot is a plate K′, stopping outside of the face of the wheel F, as shown in Fig. 7. The cover K is hinged at the slot $k$ and has its rear end $k'$ resting on a spring $k^2$. An arm $k^3$ depends from the cover K and is pivoted to a lever L. This lever L is secured at its end $l$ to a rock-shaft M, pivoted in bearings $m\ m$. The end $l^2$ of the lever L has the sector-teeth $l^3$, which engage a pinion $n$ of a shaft N, carrying a drum or reel N′. The shaft N has at its end the ratchet-teeth $n'$, provided with a spring-detent $n^2$, and the pinion $n$ is held to the shaft N by a clutch locking in one direction. The head $n^3$ of the drum has teeth $n^4$, which engage with a spring-detent O, secured in the box, such detent having a pin $o$ near its head.

On the lever L above the detent O is pivoted a catch P, its head $p$ extending toward the drum N′ and its tail pressed by a spring $p'$ and having a limiting-stop $p^2$. The head $p$ has the inclines $p^3$ and $p^4$ and the lateral extension $p^5$, the latter being immediately in line with the detent O.

Secured to the rock-shaft M at the end away from the lever L is another lever Q, projecting in the opposite direction from that of the lever L and having the several holes $q$. Secured in one of these holes is a rod $q'$, having the slotted adjustment $q^2$. At its upper end this rod $q'$ is pivoted to another rod R, which is journaled on a shaft $r$, and at its upper end has the adjustable slide $r'$.

Secured to the shaft $r$ is a feed-roller S, provided with a ratchet $s$, which is engaged by an operating-pawl $s'$ on the rod R. Just above the roller S is journaled another roller S′, and the cover may have a concave to allow the rollers to come close to the cover.

In line with the rod R is the spring-hammer T, hinged at $t$ and having its head $t'$ under the wheels F and G. The end $t^2$ of this hammer is hinged by a rule-joint $t^3$, so that it will open upward, such end $t^2$ being engaged by the slide $r'$ and normally being under the slide. Between the hammer-head $t'$ and the wheels F and G is a fixed plate U, having the slots $u\ u'$ in line with the numbers on the wheels, such plate U being slightly above the plane of the plate $k'$. To assist the spring-hammer T there may be placed under it the spring $t^3$. The hammer-head $t'$ is made in two parts, each corresponding with a slot $u\ u'$ and the numbers on the wheels.

On a roller W is placed a roll of paper V, which passes thence over the plate $k'$, between the rollers S and S′, and around the drum N′, the strip being wide enough for its edge to pass between the hammer-head $t'$ and the slotted plate U.

Whenever any one places the arm on the cover K to write upon the strip exposed at the slot $k'$, the cover descends, depressing the lever L and turning the shaft M, which operates the arm Q and the connections $q'$ and R. This depresses the hammer T, and as the slide $r'$ and the end $t$ pass each other the spring-hammer flies back, forcing the strip against the numbers on the wheels, thus printing the five minutes of time within which the name is written. As the lever L descends, the catch P passes the pin $o$, the bevel-head allowing this. At the same time the lever L turns the shaft N, winding up the spring within the drum, the pawl O holding the drum from turning. When the arm is taken from the cover K, the spring $k^2$ raises it, drawing up the lever L. The offset on the catch P, engaging the pin $o$, pulls the pawl O away from the drum, allowing the spring within to turn the drum and take up the strip of paper. The catch then passes away from the pin $o$, allowing the pawl O to fall back. At the same time the shaft N is turned back for another stroke. As this occurs, the arm R is pulled up, and its pawls turning the wheel S feeds the strip V to the drum.

If desired, there may be placed upon the device an inking-ribbon X, running over a cylindrical reservoir X′ at one end and over a feed-roller X² at the other. This ribbon passes under the wheels F and G. The feed-roller X² is operated by gearing Y, connecting it with the clock mechanism C. The reservoir X may be perforated and covered with flannel or other porous stuff, so that the ink will ooze through and impregnate the ribbon.

Having thus described our invention, what we claim is—

1. The combination of two interlocked time-movements, one of which is provided with indicating-wheels, a strip of paper located at said wheels, a movable cover, and a hammer operatively connected with said cover, as set forth.

2. The combination of two interlocked time-wheels, one of which is provided with indicating-wheels, a strip of paper located at said wheels, feeding and take-up mechanism for said paper, and a movable cover connected to such feeding and take-up mechanism, as set forth.

3. The combination of a case having an opening, a movable cover at said opening, two interlocked time-movements, one of which is provided with indicating-wheels, a strip of paper within the case under said opening and near the indicating wheels, and a hammer operatively connected to the said movable cover, as set forth.

4. The combination of the hinged cover K, the lever L, the drum N′, the shaft N, and the ratchet $n$ and its pawl $n^2$, as set forth.

5. The combination of the hinged cover K, the lever L, the shaft M, the arm Q, connection $q'$, the arm R, with the pawl and rollers S S′, the former having the ratchet, as set forth.

6. The hinged cover K, the hammer and the intervening connection, and the type-wheel whereby the hammer is caused to strike the type-wheel by the action of the cover, as set forth.

7. The wheels F and G, the spring-hammer T, the slotted plate U, and the inking-ribbon X, as set forth.

8. The combination of the drum N, having the ratchet $n^4$, the pawl O, and the lever L, having a catch P, as set forth.

In testimony whereof we affix our signatures in presence of two witnesses.

MILLARD B. LAWRENCE.
DAVID M. PATTERSON.
JOHN Q. A. SAND.

Witnesses:
WILLIAM H. BERRY,
RICHARD H. HOPKINS.